(12) United States Patent
Takahashi et al.

(10) Patent No.: US 6,390,058 B1
(45) Date of Patent: May 21, 2002

(54) ENGINE FUEL INJECTION CONTROL DEVICE

(75) Inventors: Takumi Takahashi, Fujisawa; Hideaki Shigyo, Kawasaki; Toru Mizuki, Fujisawa, all of (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/626,065

(22) Filed: Jul. 26, 2000

(30) Foreign Application Priority Data

Aug. 3, 1999 (JP) ............................................ 11-220045

(51) Int. Cl.$^7$ ................................................ F02B 3/10
(52) U.S. Cl. .................... 123/299; 123/435; 123/678; 123/686
(58) Field of Search ............................. 123/299, 464, 123/435, 678, 686

(56) References Cited

U.S. PATENT DOCUMENTS 5,954,030 A * 9/1999 Sturman et al. ............ 123/300
6,125,823 A * 10/2000 Thomas ...................... 123/299
6,161,519 A * 12/2000 Kimura et al. .............. 123/299

FOREIGN PATENT DOCUMENTS

| EP | 0 570 986 A2 | 11/1993 | ........... F02D/41/38 |
| EP | 0 889 220 A2 | 1/1999 | ........... F02D/41/14 |
| JP | 62 000659 | 1/1987 | ........... F02M/51/06 |
| JP | 62000659 A | 1/1987 | |
| JP | 62 058034 | 3/1987 | ........... F02D/41/06 |
| JP | 01055053 A | 3/1989 | |
| JP | 02099736 A | 4/1990 | |

\* cited by examiner

*Primary Examiner*—Erick Solis
(74) *Attorney, Agent, or Firm*—McCormick, Paulding & Huber LLP

(57) ABSTRACT

An engine fuel injection control device for performing prescribed pilot injection and main injection on the basis of the operating state of the engine. The control device includes a pilot injection correction unit for correcting a pilot injection quantity (PQ) on the basis of an ambient temperature (TA). Therefore, the pilot injection quantity (PQ) can be selected in accordance with the ambient temperature (TA). Noise and white smoke can be kept within prescribed limits when the ambient temperature is low.

6 Claims, 6 Drawing Sheets

ENGINE FUEL INJECTION CONTROL DEVICE

BACKGROUND OF THE INVENTION

1. Field of the Invention

The present invention relates to a fuel injection control device for a common-rail diesel engine or the like.

2. Description of the Related Art

In common-rail diesel engines, two-stage injection comprising pilot injection and main injection is performed, particularly to prevent white smoke and noise from being emitted between start-up and warm-up.

In conventional practice, the pilot injection quantity is determined in accordance with the PQ map like that shown in FIG. 7 of the accompanying drawings. In this map, water temperature TW (° C.) is plotted on the horizontal axis, and pilot injection quantity PQ is plotted on the vertical axis. The diagram on the map constantly varies with the operating state of the engine, as will be described below. Solid line (a) designates a given moment in time, but broken line (b) is also possible, depending on the operating state of the engine.

The area inside the map is divided into three regions by two set water temperatures LTW and HTW (LTW<HTW). The regions corresponding to TW≦LTW, TW≧HTW, and LTW<TW<HTW are referred to as a low-temperature area, high-temperature area, and intermediate area, respectively. In the low-temperature area, the pilot injection quantity PQ does not depend on water temperature and remains constant (LLPQ). Similarly, the pilot injection quantity PQ in the high-temperature area does not depend on water temperature and remains constant (HHPQ). It should be noted that LLPQ>HHPQ. The values inside the intermediate area are obtained by the two-point interpolation of LLPQ and HHPQ, and the diagram has a linear shape, as shown in the drawing.

The map is used to calculate the LLPQ and HHPQ values on the basis of the rotational engine speed NE and total injection quantity Q. This is indicated by the use of the smaller subscripts $_{(NE,\ Q)}$ in the drawing. Thus, LLPQ and HHPQ vary with the operating state of the engine, and the diagram on the map constantly varies as a result.

FIG. 8 of the accompanying drawings illustrates a flowchart for calculating the pilot injection quantity. The rotational engine speed NE, total injection quantity Q, and water temperature TW are first sensed or computed in step 401, and LLPQ and HHPQ are calculated in step 402. After being thus defined, the PQ map shown in FIG. 7 is used in the subsequent step 403 to calculate the pilot injection quantity PQ on the basis of the water temperature TW.

An engine commonly emits undesirable white smoke when operating at a low ambient temperature. Methods in which spark advance is employed for the fuel injection timing have been suggested to counter this phenomenon, but these methods increase the noise level. For this reason, pilot injection has become an extremely effective means for keeping white smoke and noise within prescribed limits at low ambient temperatures.

With these conventional techniques, however, the pilot injection quantity is determined without taking into account the ambient temperature in any way. Consequently, these techniques cannot yet be considered adequate for controlling pilot injection, and keeping white smoke and noise within prescribed limits is still a difficult task.

SUMMARY OF THE INVENTION

The present invention provides an engine fuel injection control device for performing prescribed pilot injection and main injection on the basis of the operating state of the engine, comprising pilot injection correction means for correcting the pilot injection quantity on the basis of the ambient temperature.

This arrangement allows the pilot injection quantity to be selected in accordance with the ambient temperature, and pilot injection to be controlled optimally and adequately.

The pilot injection correction means preferably takes corrective action to increase the pilot injection quantity if the ambient temperature falls below a specified level.

The pilot injection correction means preferably operates such that no corrective action is taken if the water temperature is greater a first specified value on a high-temperature side.

The pilot injection correction means preferably operates such that no corrective action is taken if the water temperature is less than a second specified value on a low-temperature side.

DETAILED DESCRIPTION OF THE INVENTION

Embodiments of the present invention will now be described with reference to the accompanying drawings.

Figure 6:
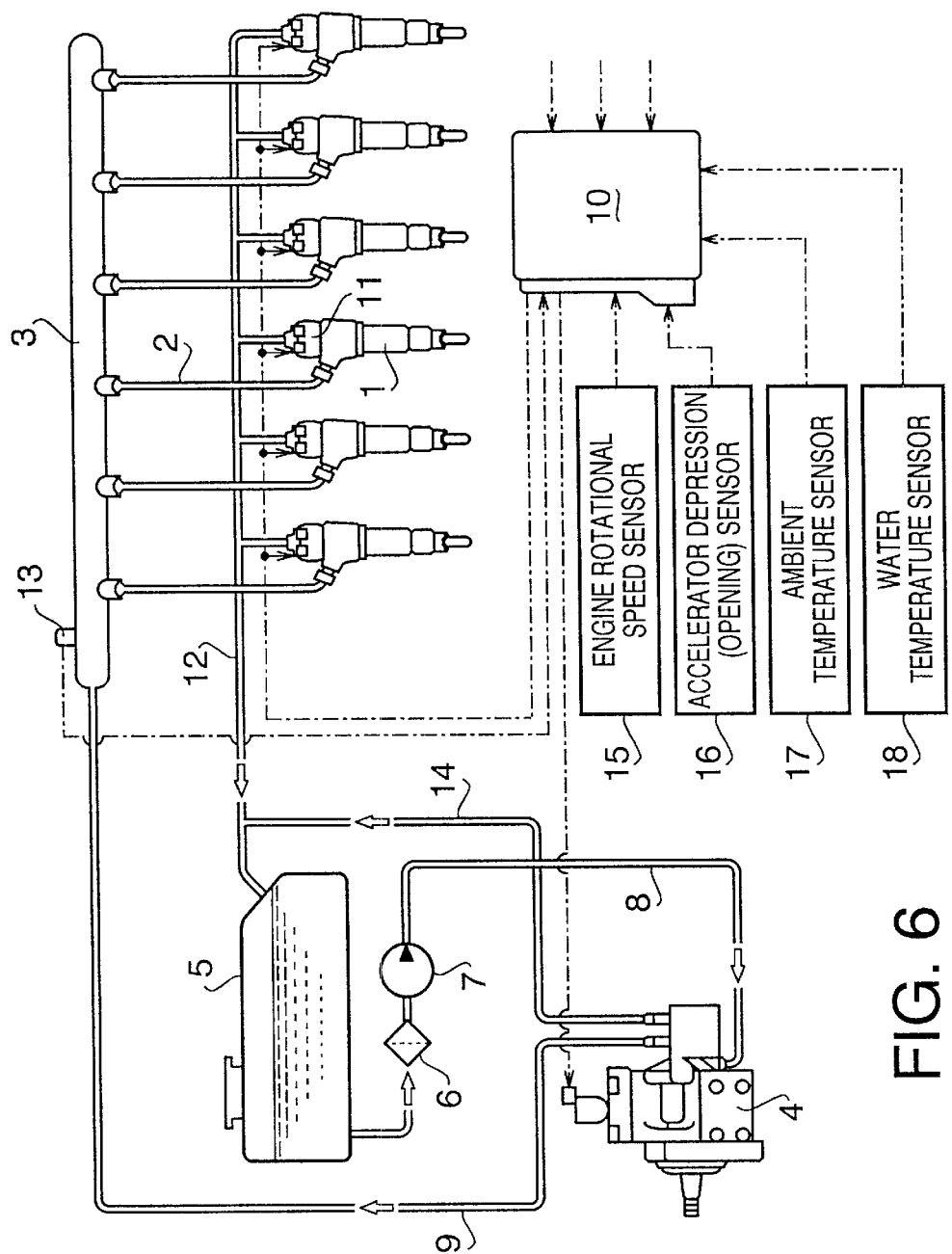
FIG. 6 diagrammatically illustrates a common-rail fuel injection device.
Figure 7:
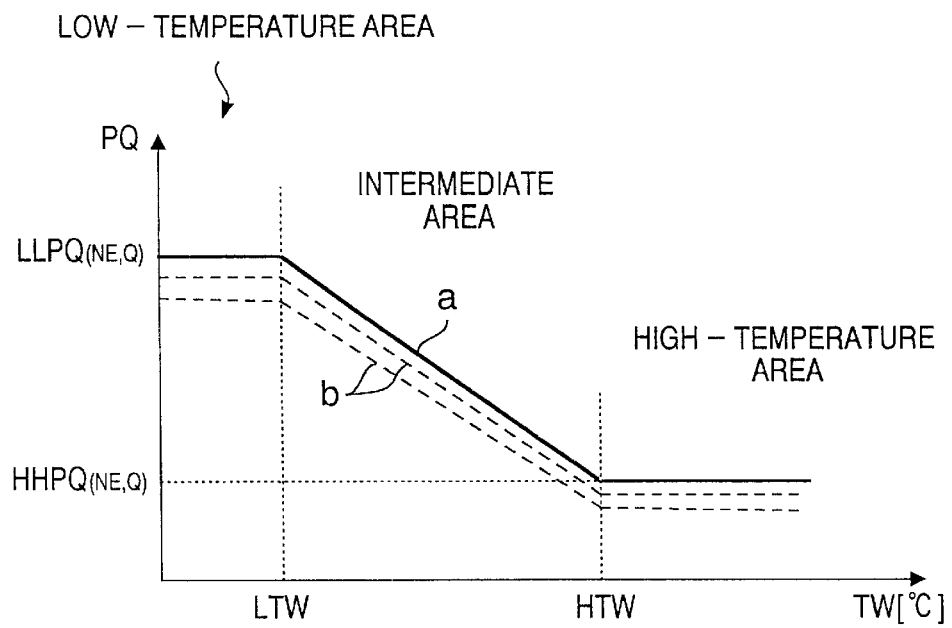
FIG. 7 illustrates a conventional map for calculating the pilot injection quantity.
Figure 8:
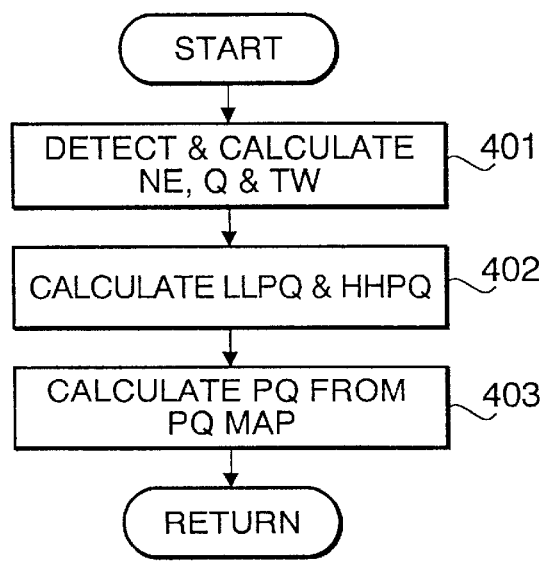
FIG. 8 illustrates a conventional flowchart for determining the pilot injection quantity.

Referring to FIG. 6, illustrated is a fuel injection control device for a common-rail, direct injection diesel engine used in the present invention. Each cylinder of the engine is provided with an injector 1, and high-pressure fuel, which is stored in a common rail 3 at a common rail pressure (from several tens megapascals to several hundred megapascals), is constantly fed to the injectors 1 through high-pressure tubes 2. A high-pressure pump 4 is primarily used to pump the fuel to the common rail 3. Specifically, fuel under normal pressure is suctioned by a feed pump 7 from a fuel tank 5 through a fuel filter 6, and is thereby sent to the high-pressure pump 4 through a feed pipe 8. The fuel is pressurized there and is sent to the common rail 3 through a high-pressure pipe 9.

An electronic control unit (hereinafter "ECU") 10 for performing overall fuel injection control is provided, and this unit sends appropriate drive pulses to the electromagnetic solenoid 11 of each injector 1 and controls the opening and closing of these injectors 1 in accordance with the operating state (rotational speed, load, and the like) of the engine. The fuel is injected when the respective electromagnetic solenoid 11 is switched on, and the fuel injection is stopped when the electromagnetic solenoid 11 is switched off. When the injection is stopped, the leak fuel in the injector 1 is returned to the fuel tank 5 via a leak pipe 12.

ECU 10 also controls the common rail pressure by feedback in accordance with the operating state of the engine. Specifically, the common rail 3 is provided with a common rail pressure sensor 13, and the ECU 10 controls the output pressure of the high-pressure pump 4 on the basis of the pressure value thereof. At this time, excess fuel is returned to the fuel tank 5 via a return pipe 14. The common rail pressure is directly converted to injection pressure.

ECU 10 reads the rotational engine speed NE from the output of a rotational engine speed sensor 15, the accelerator aperture AC from the output of an accelerator aperture sensor 16, the ambient temperature TA from the output of an ambient temperature sensor 17, and the temperature TW of the engine cooling water from the output of a water temperature sensor 18. In addition, the ECU 10 reads various types of data from a variety of sensors (not shown).

With this device, prescribed pilot injection and main injection, that is, two-stage injection, is performed based on the operating state of the engine. In this arrangement, combustion by main injection is performed on the basis of ignition by pilot injection, making it possible to establish balance or the like between white smoke and noise.

Figure 5:
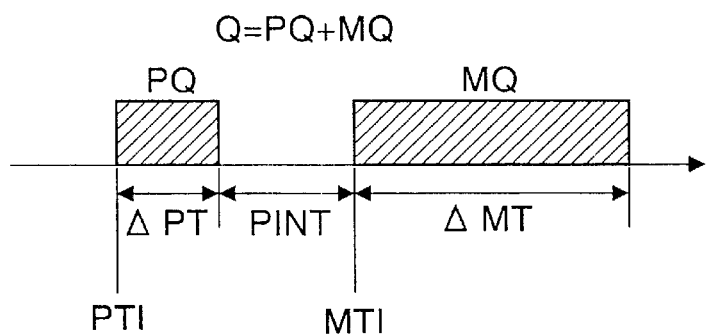
FIG. 5 is a time chart depicting the relation between pilot injection and main injection.

FIG. 5 depicts a specific type of two-stage injection. The pilot injection quantity is designated as PQ; the main injection quantity, as MQ. Their sum PQ+MQ is the total injection quantity Q. The pilot injection quantity PQ and the main injection quantity MQ can be substituted with injector conduction periods ΔPT and ΔMT such that each injection quantity is actually controlled by controlling the conduction periods. The start time of pilot injection is designated as PTI; the start time of main injection, as MTI. A prescribed non-injection period (that is, a pilot interval) exists between pilot injection and main injection. Here, the pilot interval is defined as the interval PINT between the end of pilot injection and the start of main injection. The periods and intervals are measured in crank angles (° C.A). ECU 10 determines the arrival of each interval or the like on the basis of rotational pulses (crank angles) obtained from a rotational engine speed sensor 15. Here, the phase lag direction (direction of increased crank phase) is taken to be positive in sign.

The manner in which fuel injection (particularly pilot injection) is controlled by the present device will now be described.

Figure 1:
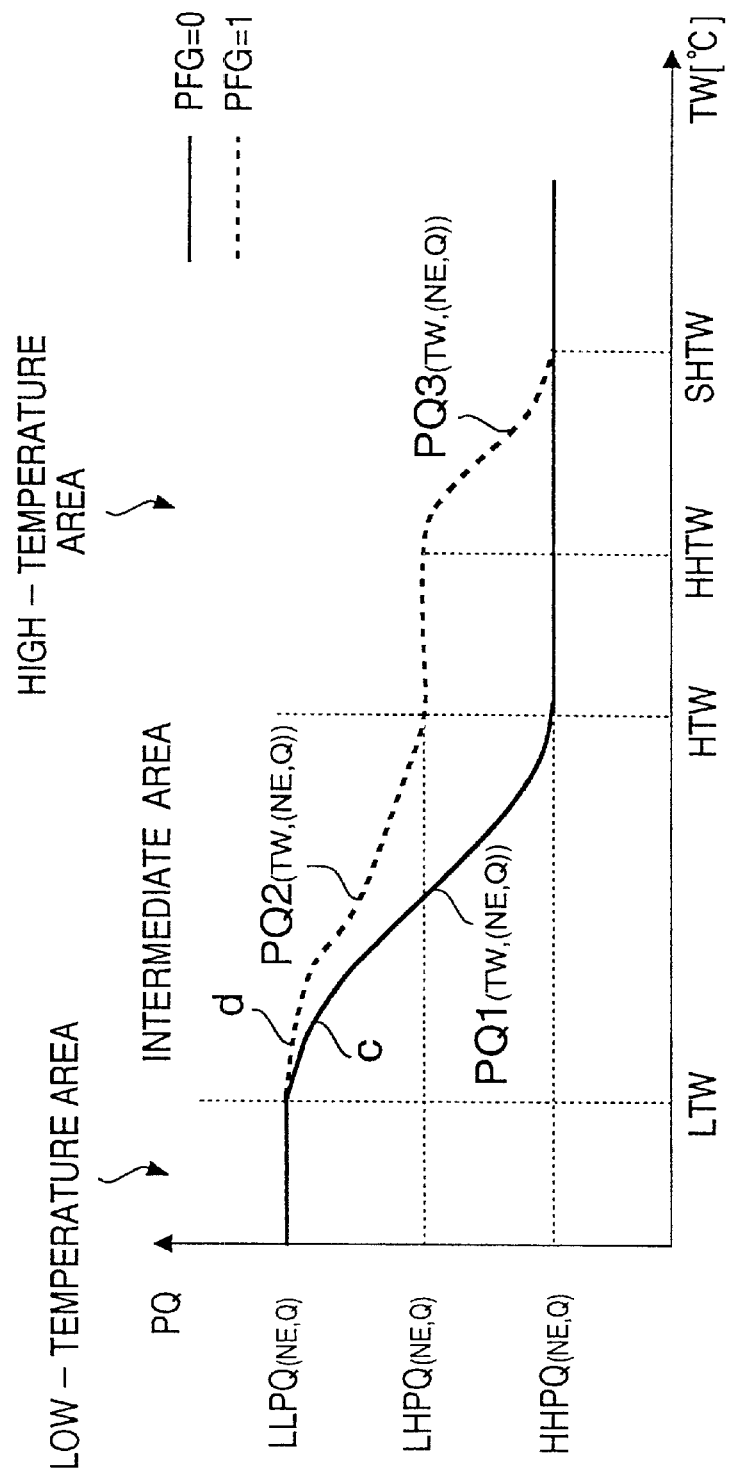
FIG. 1 illustrates a map for calculating the pilot injection quantity.

Similar to conventional practice, the pilot injection quantity is determined in accordance with the PQ map shown in FIG. 1. Water temperature TW (° C.) is plotted on the horizontal axis on the map, and pilot injection quantity PQ is plotted on the vertical axis. The area inside the map is divided into three regions by two set water temperatures LTW and HTW (LTW<HTW). The regions corresponding to TW≦LTW, TW≧HTW, and LTW<TW<HTW are referred to as a low-temperature area, high-temperature area, and intermediate area, respectively.

The present device operates such that if the ambient temperature drops below a certain level, corrective action is taken to raise the pilot injection quantity in relation to the base quantity. Solid line (c) on the map indicates the base amount (hereinafter "the base pilot injection quantity") of the pilot injection quantity, and broken line (d) indicates the corrected pilot injection quantity.

The base pilot injection quantity (solid line (c)) has constant values LLPQ and HHPQ, which are independent of the water temperature in the low-temperature and high-temperature areas. These values are such that LLPQ>HHPQ. The values inside the intermediate area are obtained by the two-point interpolation of LLPQ and HHPQ. The diagram shown here is a graph of the function PQ1 described below, and should preferably be a curve such as that shown in the drawing.

The LLPQ and HHPQ values are calculated in accordance with a special map (not shown) on the basis of the rotational engine speed NE and total injection quantity Q. This is indicated by the use of the smaller subscripts $_{(NE,\ Q)}$ in the drawing. Thus, LLPQ and HHPQ vary with the operating state of the engine, and the diagram (c) and (d) on the map constantly vary as a result. These features are the same as in conventional practice. The total injection quantity Q is precalculated in accordance with a specific map (not shown) on the basis of the rotational engine speed NE and accelerator aperture AC.

Function PQ1 can be set arbitrarily. An N-order function (where N is a natural number) expressed by the following equation is used herein.

$$PQ1_{(TW,\ (NE,Q))} = C_N \cdot TW^N + C_{N-1} \cdot TW^{N-1} + \ldots + C_1 \cdot TW + C_0,$$

where $C_N, C_{N-1}, \ldots C_1$, and $C_0$ are arbitrary constants selected such that PQ1=LLPQ if TW=LTW, and PQ1=HHPQ if TW=HTW. $PQ_1$ depends on the rotational engine speed NE and total injection quantity Q, and assumes the form of an N-order equation relative to water temperature TW. This is designated by the smaller subscripts $_{(TW,\ (NE,\ Q))}$ in the drawing. It is assumed here that N≧2 and that the diagrams are curves. It should be noted that N can be 1. In such case, the curves would become the conventional straight lines.

In the low-temperature area, the corrected pilot injection quantity (broken line (d)) has a constant value LLPQ and is independent of water temperature in the same manner as is the base pilot injection quantity. In the intermediate area and high-temperature area, however, this quantity is different from the base pilot injection quantity.

Specifically, two set water temperatures HHTW and SHTW (HTW<HHTW<SHTW) are established in the high-temperature area, and the corrected pilot injection quantity assumes a constant value LHPQ (>HHPQ) if the water temperature TW is such that HTW≦TW≦HHTW. This LHPQ is also calculated in accordance with a special map (not shown) on the basis of the rotational engine speed NE and total injection quantity Q, and a subscript $_{(NE,\ Q)}$ is attached thereto in the drawing.

In the intermediate area, the corrected pilot injection quantity is obtained by the two-point interpolation of LLPQ and LHPQ. This value is calculated as an N-order function PQ2 similar to PQ1, and the diagram should preferably be a curve similar to PQ1. A subscript $_{(TW,\ (NE,\ Q))}$ is attached in the drawing. The corrected pilot injection quantity produced by PQ2 is greater than the base quantity produced by PQ1.

In the intermediate area, the difference between the corrected pilot injection quantity and the base pilot injection quantity, that is, the correction quantity, gradually increases with increased water temperature, reaching a maximum (LHPQ−HHPQ) at the water temperature HTW.

In the high-temperature area, in the region where HHTW<TW<SHTW, the corrected pilot injection quantity is obtained by the two-point interpolation of LHPQ and HHPQ. This value is calculated as an N-order function PQ3 similar to PQ1 and PQ2, and the diagram should preferably be a curve similar to PQ1 or PQ2. A subscript $_{(TW, (NE, Q))}$ is attached in the drawing. The corrected pilot injection quantity provided by PQ3 is greater than the base quantity HHPQ.

In this region, the difference between the corrected pilot injection quantity and the base pilot injection quantity, that is, the correction quantity, gradually decreases with increased water temperature, and becomes zero at the water temperature SHTW.

In the subsequent region of SHTW≦TW, the corrected pilot injection quantity becomes equal to the base pilot injection quantity HHPQ, and the correction quantity remains at zero level.

The correction is thus zero in regions where TW≦LTW and SHTW≦TW, and no corrective action is taken. These SHTW and LTW correspond to the first specified value on the high-temperature side and the second specified value on the low-temperature side referred to in the present invention.

In this arrangement, the low-temperature area is one in which low-temperature starting is primarily performed and which is subject to requirements related to low-temperature starting properties, white smoke, and noise. The LLPQ is therefore selected such that all these requirements are met. The high-temperature area, on the other hand, is one that follows engine warm-up, so exhaust gas compatibility must take precedence over start-up properties and the like. Accordingly, the HHPQ, LHPQ, and PQ3 are selected such that this requirement is met. The intermediate area is one in which engine warm-up is in its medium stage, so a balance between white smoke and noise is of primary importance. Accordingly, the PQ1 and PQ2 are selected such that this requirement is met.

Figure 3:
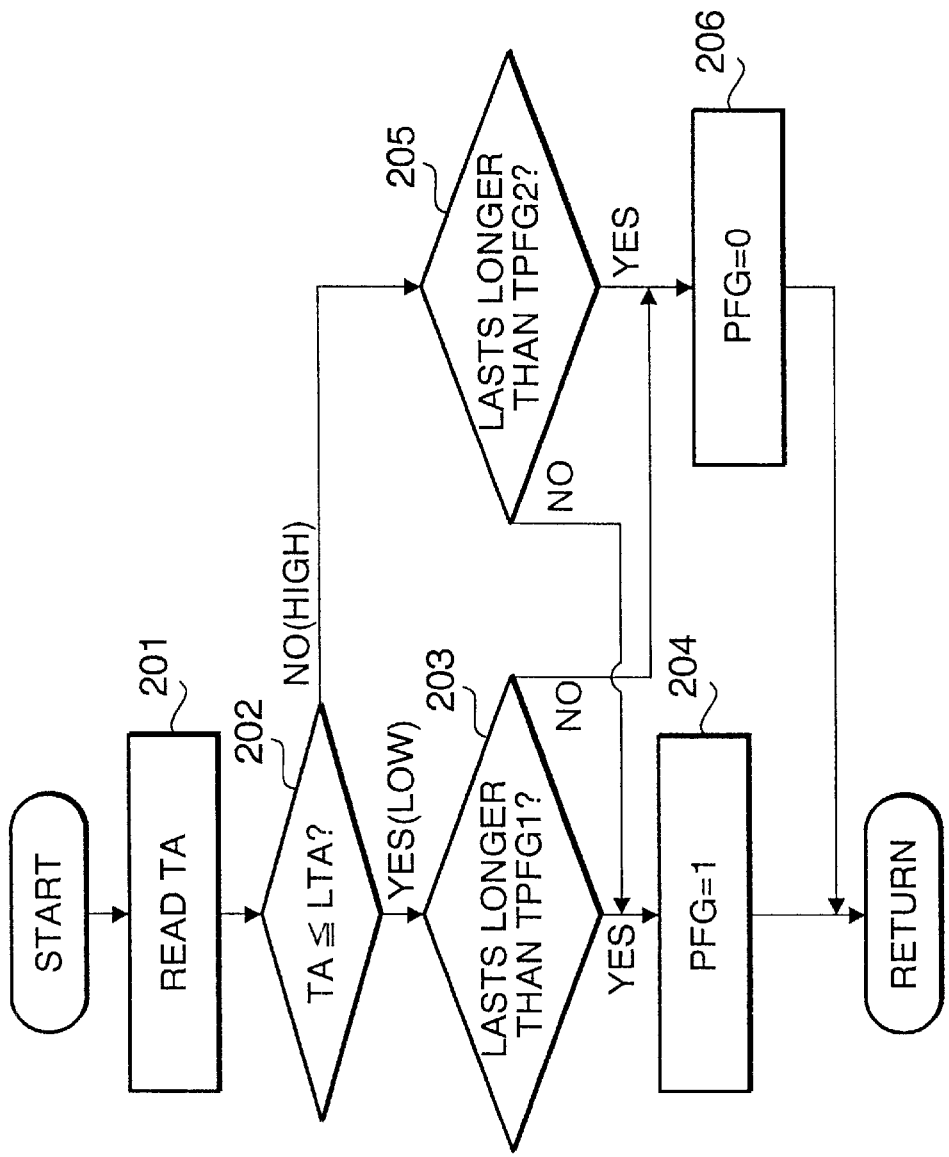
FIG. 3 illustrates a flowchart for determining a correction for the ambient temperature.

A method for evaluating the advisability of taking corrective action for the ambient temperature will now be described. The method is performed by ECU 10 in accordance with the evaluation flowchart shown in FIG. 3.

ECU 10 first reads the ambient temperature TA in step 201. The ambient temperature TA is compared with a specified temperature LTA in step 202.

If TA≦LTA, the operation proceeds to step 203, and it is determined whether this state lasts longer than TPFG1 (sec). If the answer is yes, the operation proceeds to step 204, and an ambient temperature correction-indicating flag PFG is set to 1. If the answer is no, the operation proceeds to step 206, and the ambient temperature correction-indicating flag PFG is set to zero.

If TA>LTA in step 202, the operation proceeds to step 205, and it is determined whether this state lasts longer than TPFG2 (sec). If the answer is yes, the operation proceeds to step 206, and the ambient temperature correction-indicating flag PFG is set to zero. If the answer is no, the operation proceeds to step 204, and the ambient temperature correction-indicating flag PFG is set to 1.

If the ambient temperature correction-indicating flag PFG is 1, the operation is corrected for the ambient temperature, and if the ambient temperature correction-indicating flag PFG is zero, there is no correction for the ambient temperature. This procedure has so-called hysteresis to prevent the flag from being switched when a flag switching condition (TA≦LTA or TA>LTA) is established but the corresponding state does not last for a prescribed time. Control stability is thereby maintained. The initial value of the flag PFG is 0.

Figure 2:
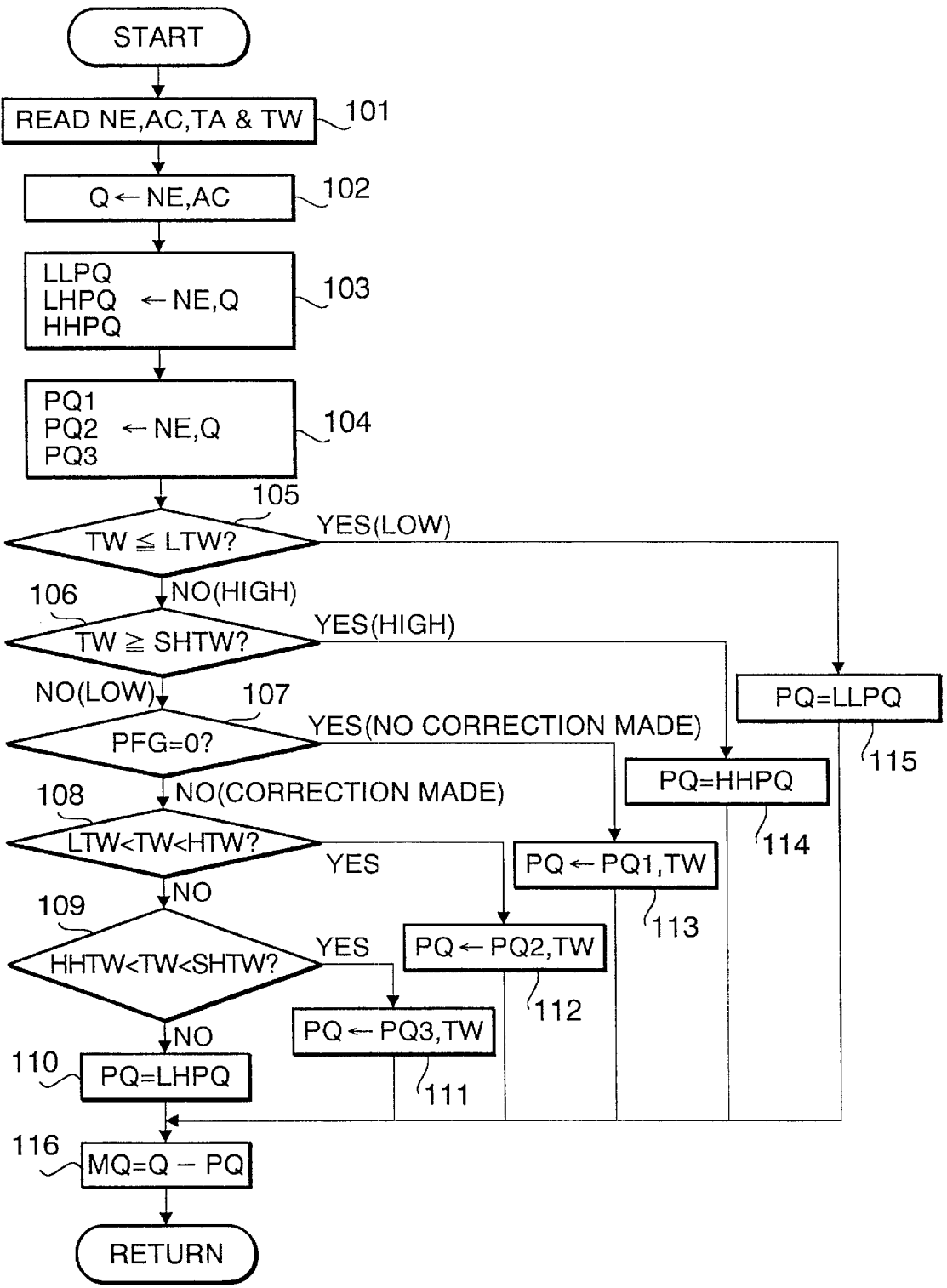
FIG. 2 illustrates a flowchart for determining the fuel injection quantity.

Once the advisability of taking corrective action for the ambient temperature has been established, the pilot injection quantity PQ and main injection quantity MQ are selected in accordance with the injection quantity selection procedure shown in FIG. 2. This procedure is repeatedly performed by the ECU 10 for each control cycle.

ECU 10 first reads the rotational engine speed NE, accelerator aperture AC, ambient temperature TA and water temperature TW in step 101. The total injection quantity Q is then calculated in step 102 in accordance with a prescribed map on the basis of the rotational engine speed NE and accelerator aperture AC. LLPQ, LHPQ, and HHPQ are subsequently calculated in step 103 m accordance with a prescribed map on the basis of the rotational engine speed NE and total injection quantity Q. Functions PQ1, PQ2, and PQ3 are then determined in step 104 on the basis of the rotational engine speed NE and total injection quantity Q. After the PQ map has thus been confirmed, the pilot injection quantity PQ can be calculated in the following manner with the aid of this map.

Specifically, the operation first proceeds to step 105, and the water temperature TW is compared with a set water temperature LTW. If TW≦LTW, the operation proceeds to step 115, and the condition PQ=LLPQ is established. If TW>LTW, the operation proceeds to step 106, and the water temperature TW is compared with a set water temperature SHTW. If TW≧SHTW, the operation proceeds to step 114, and the condition PQ=HHPQ is established. If TW<SHTW, the operation proceeds to step 107, and it is determined whether the ambient temperature correction-indicating flag PFG is at zero.

If PFG=0 (that is, it has been determined that no correction is needed for the ambient temperature), the operation proceeds to step 113, and the pilot injection quantity PQ is calculated on the basis of the function PQ1 and water temperature TW.

If PFG=1 (that is, it has been determined that a correction is needed for the ambient temperature), the operation proceeds to step 108, and it is determined whether the water temperature TW is within the region where LTW<TW<HTW. If the temperature is within this region, the operation proceeds to step 112, and the pilot injection quantity PQ is calculated on the basis of the function PQ2 and water temperature TW. If the temperature is outside this region, the operation proceeds to step 109, and it is determined whether the water temperature TW is within the region where HHTW<TW<SHTW. If the temperature is within this region, the operation proceeds to step 111, and the pilot injection quantity PQ is calculated on the basis of the function PQ3 and water temperature TW. If the temperature is outside this region, the operation proceeds to step 110, and the condition PQ=LHPQ is established.

Once the pilot injection quantity PQ has been calculated in this manner, the main injection quantity MQ is calculated in accordance with the equation MQ=Q−PQ. The procedure is completed once the pilot injection quantity PQ and main injection quantity MQ have been determined in this manner. The pilot injection quantity PQ and main injection quantity MQ thus determined are immediately substituted with injector conduction periods ΔPT and ΔMT.

Figure 4:
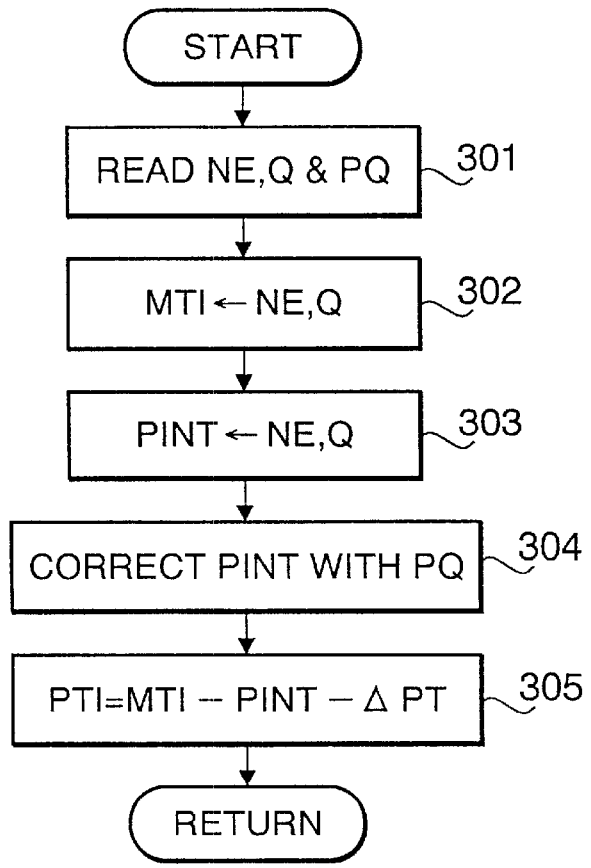
FIG. 4 is a flowchart for determining the fuel injection period.

Following is a description of a method for determining the fuel period, that is, the pilot injection time PTI and main injection time MTI. ECU 10 repeatedly determines these periods for each control cycle in accordance with the injection timing setup procedure shown in FIG. 4.

ECU 10 first reads the rotational engine speed NE, total injection quantity Q, and pilot injection quantity PQ in step 301. The main injection time MTI is then calculated in step 302 in accordance with a prescribed map on the basis of the rotational engine speed NE and total injection quantity Q. The pilot interval PINT is subsequently calculated in step 303 in accordance with a prescribed map on the basis of the rotational engine speed NE and total injection quantity Q.

The pilot interval PINT is then corrected according to the pilot injection quantity PQ in step 304. Specifically, the correction for the pilot interval PINT increases with an increase in the pilot injection quantity PQ. The operation then proceeds to step 305, and the pilot injection time PTI is calculated using the following equation.

$$PTI=MTI-PINT-\Delta PT$$

Determining the final injection time PTI or MTI and the injector conduction period $\Delta PT$ or $\Delta MT$ in this manner allows the electromagnetic solenoids 11 of injectors 1 to be switched on during the corresponding conduction time as soon as the injection period starts. The desired two-stage injection conforming to the current operating state of the engine can thereby be maintained.

Thus, the present invention allows the pilot injection quantity PQ to be corrected on the basis of the ambient temperature TA, making it possible to maintain an optimum pilot injection quantity in accordance with the ambient temperature TA, and to control pilot injection in an optimal and adequate manner. White smoke and noise can thus be constantly kept within prescribed limits.

In particular, the present device takes corrective action to increase the pilot injection quantity PQ over the base quantity thereof in a specific water temperature range (LTW<TW<SHTW) when the ambient temperature TA falls below a specified temperature LTA. Ignition and combustion are thereby improved, and both the white smoke conditions and the noise conditions are met. Conversely, the required minimum base quantity is injected when the ambient temperature TA is a high temperature above a specified temperature LTA in the range of water temperatures involved, preventing wasteful injection of fuel and improving fuel economy.

Irrespective of the ambient temperature TA, no corrective action is taken when the water temperature TW is higher than SHTW. This is done in order to prevent overheating.

Nor is any corrective action taken when the water temperature TW is less than LTW, irrespective of the ambient temperature TA. This is because an optimum pilot injection quantity LLPQ has already been selected according to a separate map in order to satisfy the requirements related to starting properties, white smoke, and noise in this water temperature region (low-temperature area), so further correcting increasing) this quantity in accordance with the ambient temperature would result in excessive pilot combustion and increased noise.

The above-described PQ1, PQ2, and PQ3 should preferably be quadratic or higher functions. This is because such functions allow the pilot injection quantity PQ to be adjusted more finely in relation to the water temperature TW than when a conventional linear function is used.

In the present device, the correction for the pilot interval PINT increases with increased pilot injection quantity PQ. This is because ignition delay and the combustion period increase with increased pilot injection quantity PQ, making it necessary to start fuel injection proportionately earlier.

As can be seen from the above-described embodiment, the pilot injection correction means of the present invention is composed of an ECU 10.

The embodiments of the present invention are not limited to the one described above and include various other options. For example, pilot injection in transition can be corrected for the ambient temperature by transitional evaluation. The ambient temperature may also be replaced with the intake temperature. The correction may also be increased or reduced in a way different from that described with respect to the present embodiment, and the water temperature for switching the correction is not limited by the LTW, HTW, HHTW, or SHTW described with reference to the present embodiment. In certain cases, it is possible to take a corrective action aimed at establishing a quantity that is less than the base quantity. The present invention can be applied to an engine other than a common-rail diesel engine.

The illustrated and described engine fuel injection control device is disclosed in Japanese Patent Application No. 11-22004 filed on Aug. 3, 1999 in JPO, the instant application claims priority of this Japanese Patent Application, and the entire disclosure thereof is incorporated herein by reference.

What is claimed is:

1. An engine fuel injection control device for performing pilot injection and main injection, said control device being one whereby a base pilot injection quantity is determined on the basis of rotational engine speed (NE), a total fuel injection quantity (Q), and a temperature of engine cooling water (TW), and whereby the base pilot injection quantity is set such that the lower the temperature of the engine cooling water is, the more the base pilot injection quantity is, and the higher the temperature of the engine cooling water is, the less the base pilot injection quantity is, and whereby when an ambient temperature is lower than a prescribed temperature, correction of the base pilot injection quantity is performed so as to increase the pilot injection quantity, and whereby when the temperature of the engine cooling water is higher than a first prescribed temperature on a high-temperature side, the correction of the base pilot injection quantity on the basis of the ambient temperature is not performed.

2. The engine fuel injection control device as defined in claim 1, including a sensor for detecting the ambient temperature.

3. The engine fuel injection control device as defined in claim 1, wherein the engine is a common rail type diesel engine.

4. An engine fuel injection control device for performing pilot injection and main injection, said control device being one whereby a base pilot injection quantity is determined on the basis of rotational engine speed (NE), a total fuel injection quantity (Q), and a temperature of engine cooling water (TW), and whereby the base pilot injection quantity is set such that the lower the temperature of the engine cooling water is, the more the base pilot injection quantity is, and the higher the temperature of the engine cooling water is, the less the base pilot injection quantity is, and whereby when an ambient temperature is lower than a prescribed temperature, correction of the base pilot injection quantity is performed so as to increase the pilot injection quantity, and whereby when the temperature of the engine cooling water is lower than a second prescribed temperature on a low-temperature side, the correction of the base pilot injection quantity on the basis of the ambient temperature is not performed.

5. The engine fuel injection control device as defined in claim 4, including a sensor for detecting the ambient temperature.

6. The engine fuel injection control device as defined in claim 4, wherein the engine is a common rail type diesel engine.

\* \* \* \* \*